United States Patent [19]
Hosie et al.

[11] Patent Number: 6,059,262
[45] Date of Patent: May 9, 2000

[54] VALVE OPERATOR AND METHOD

[75] Inventors: David G. Hosie, Sugar Land; Michael B. Grayson; David G. Ward, both of Houston, all of Tex.

[73] Assignee: Gulf Technologies International, L.C., Houston, Tex.

[21] Appl. No.: 09/178,006

[22] Filed: Oct. 23, 1998

[51] Int. Cl.[7] ................................................. F16K 31/44
[52] U.S. Cl. ......................... 251/266; 251/267; 251/273
[58] Field of Search .................................. 251/266, 267, 251/273, 274, 264

[56] References Cited

U.S. PATENT DOCUMENTS

| | | | |
|---|---|---|---|
| 2,585,667 | 2/1952 | Meador | 251/273 |
| 3,071,343 | 1/1963 | Milleville | 251/266 |
| 4,488,704 | 12/1984 | Wicker | 251/273 |
| 4,968,002 | 11/1990 | Gibson et al. | 251/266 |

OTHER PUBLICATIONS

Baker Tools Advertisement p. 305 from *Composite Catalog of Oil Field Equipment and Services*, published by World Oil, Gulf Publishing Co., P.O. Box 2608, Houston, TX No Date.

Rockwell International Advertisement, p. 5593, from *Composite Catalog of Oil Field Equipment and Services*, published by World Oil, Gulf Pub. Co, P.O. Box 2608 Houston, TX No Date.

Primary Examiner—David J. Walczak
Attorney, Agent, or Firm—Kenneth L. Nash

[57] ABSTRACT

The valve operator of the present invention provides an apparatus and method for reducing torque necessary for opening and closing a valve, such as a quarter-turn rotary valve. In the preferred embodiment, an outer handle adaptor has inner curved tracks that drive balls positioned in straight slots of a middle cylinder. As the balls move in the straight slots, they transfer torque energy to a valve shaft adaptor mounted within the middle cylinder and having outer curved threads that mesh with the balls. The pitch of the curved tracks of the outer handle differ from the pitch the curved tracks of the valve shaft adaptor to thereby effect a desired torque reduction ratio. The valve operator has relatively few components, at least three or more relatively rotatable components, preferably arranged in meshing configuration so as to effect a small size operator without the use of a gear box. The size of the operator is so small that it is comparable or the effectively the same as that of a valve having a simple straight-shaft valve operator.

21 Claims, 5 Drawing Sheets

VALVE OPERATOR AND METHOD

1. FIELD OF THE INVENTION

The present invention relates to valve operators and, more specifically, to a compact valve operator for reducing torque required to operate a valve.

2. BACKGROUND OF THE INVENTION

The operation of a rotary valve, such as a quarter turn valve, may often require application of considerable torque for opening and closing the valve. The applied force depends on operating conditions, type of valve seals, and so forth. It has long been desirable to reduce the valve operation torque as evidenced in the prior art in which means such as gear boxes and/or chain drive devices have been long used for reducing torque to open and close the valve. However, such torque reduction devices require a significant amount of space due to their bulk. In many situations, bulky torque reduction devices are of limited value due to limited space. Such bulky prior art devices also tend to be expensive. Furthermore, it may be difficult to mount such devices to the valve without a significant amount of special machining and/or additional mounting components, even if suitable mounting space is available.

It would be desirable to have a valve operator that takes up little, if any, additional space as compared to a simple straight shaft valve operator. Although a straight shaft has no reduction at all, it is quite compact except for the size of the wheel or shaft, often removable, used to open and close the valve. Therefore a valve operator that offers reduction of torque yet takes up little or no more space than a simple straight shaft would be highly desirable and fills a long felt need in the industry. Those skilled in the art will appreciate the present invention that addresses these and other problems.

SUMMARY OF THE INVENTION

The present invention and method relate to a highly compact valve operator that is effectively about the same size as, or similar in size to, a simple straight shaft. The device of the present invention is readily adaptable to many types of valves or other rotationally operated devices, and is especially suitable for use with quarter-turn valves. No gear box or chains are necessary and only a few components are used. A presently preferred embodiment of the invention describes a selected torque reduction ratio, such as a three-to-one (3:1) reduction in torque, required to open or close a quarter-turn valve. Although the present invention is described subsequently with an embodiment having a 3:1 torque reduction for use with a quarter-turn valve, it will be understood that the present invention may be used to reduce torque by other ratios and may be adapted for use with other valves or devices that require other ranges of torque reduction. For instance, with the same quarter-turn valve, other valves, or larger valves a greater torque reduction ratio may be desired, e.g., 4:1 or 6:1.

Thus, the valve operator of the present invention may be used with a valve of the type having a valve body and a rotary valve shaft that is rotatable with respect to the valve body. The valve operator comprises a first component having a first curved track and a second component having a second curved track. The second component mounts within the first component and is rotatably with respect thereto. A third component mounts between the first component and the second component. The third component engages the first curved track and the second curved track. The third component preferably has a connection end that is profiled for attachment to the valve body. The second component preferably has a connection end that is profiled for attachment with the rotary valve shaft.

The third component comprises a sleeve, which sleeve is cylindrical in the presently preferred embodiment. The sleeve defines at least one slot but preferably at least two slots therein. One or more balls are disposed in the at least two slots for engageably connecting with the first and second components along the first curved track and the second curved track.

In the presently preferred embodiment, the slots are substantially parallel to an axis of rotation of the third component. The first curved track preferably comprises at least one spiraling slot. The first curved track may comprise helical fluting. The first curved track could comprise helical ridges as well if the remainder of the operator were revised accordingly. The second curved track comprises spiraling or helical slots.

The first curved track is preferably oriented at a first angle with respect to an axis of rotation of the first component, and the second curved track is oriented at a second angle with respect to an axis of rotation of the second component. To obtain torque reduction, it is desirable that the first angle is not equal to the second angle. To obtain a three-to-one torque reduction or other selected torque reduction, the first angle and the second angle are arranged to produce a three-to-one turns ratio or other selected turns ratio between the first component and the second component. It will be clearly understood that the present invention is not limited to any particular ratio.

Stated differently, the device comprises a first component having an inner engagement surface and a second component having an outer engagement surface. The second component is mounted within the first component for rotation with respect thereto.

A third component is mounted between the first component and the second component. The third component has an outer contoured profile for engaging and/or connecting with the inner engagement surface of the first member and an inner contoured profile for engaging and/or connecting with the outer engagement surface of the second member. The third component is rotatable with respect to the first component and the second component. The inner engagement surface of the first component comprises a curved configuration, and the outer engagement surface of the second component comprises a curved configuration. For instance, the inner engagement surface may define at least one curved slot. In a preferred embodiment, a plurality of protrusion members extend radially on either side of the third component. Preferably but not absolutely required, the protrusion members comprise spherical surfaces, such as provided by steel balls.

A method for making an operator is given for converting torque, such as reducing or multiplying, necessary for rotating a shaft, which shaft is rotatable within a body or housing. The method comprises providing first, second, and third components such that the second component is within the first component and the third component is between the first and second components. The first component is provided with a surface for curved engagement at a first curved angle with the third component. The second component is provided with a surface for curved engagement at a second curved angle with the third component. The method may further comprise affixing the third component to the body.

The first component is preferably adapted to support a handle. The second component is preferably secured to the movable valve shaft.

An object of the present invention is to provide an improved operator and method.

Another object of the present invention is to provide a compact valve operator and method of making the same.

Yet another object of the present invention is to provide an operator for reducing torque that is little or no different in size as would be a straight shaft secured to a handle support.

A feature of the present invention is an operator with components fitting inside one another to provide a compact design.

Another feature of the present invention is tracks on the inner and outer components that are angled differently to effect the desired torque reduction.

Yet another feature of the present invention is a component disposed within between the inner and outer components for rotational engagement therewith.

An advantage of the operator of the present invention is that it can be used where space is restricted.

Another advantage of the present invention is very sturdy construction.

Yet another advantage of the present invention is relatively easy adaptability to valves in general.

These and other objects, features, and advantages of the present invention will become apparent to those skilled in the art upon review of the drawings, claims, and disclosure of the invention.

BRIEF DESCRIPTION OF THE PREFERRED EMBODIMENTS

Figure 1:
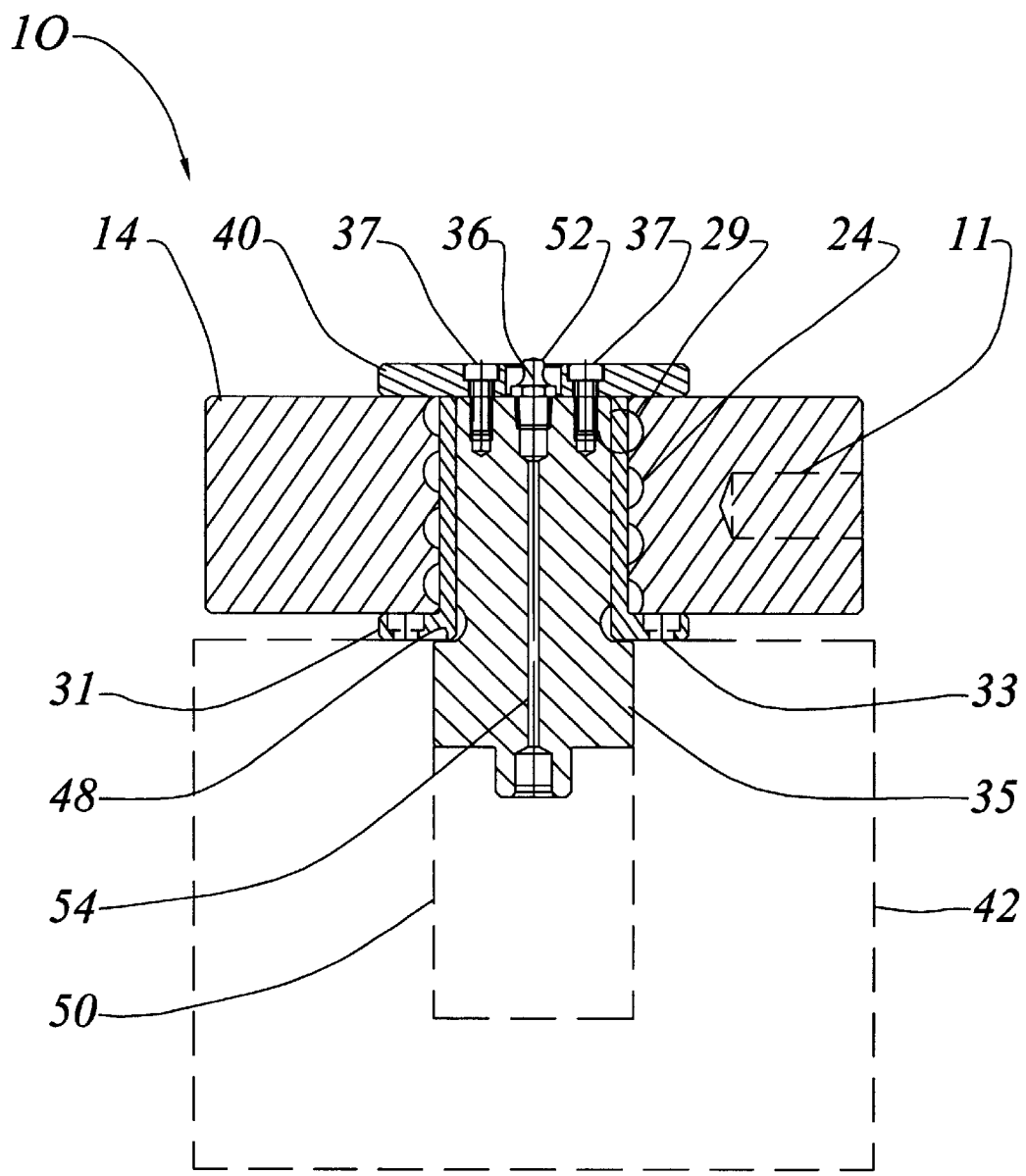
FIG. 1 is an elevational view, in section, of an operator in accord with the present invention shown with a portion of a valve indicated in dash.
Figure 5:
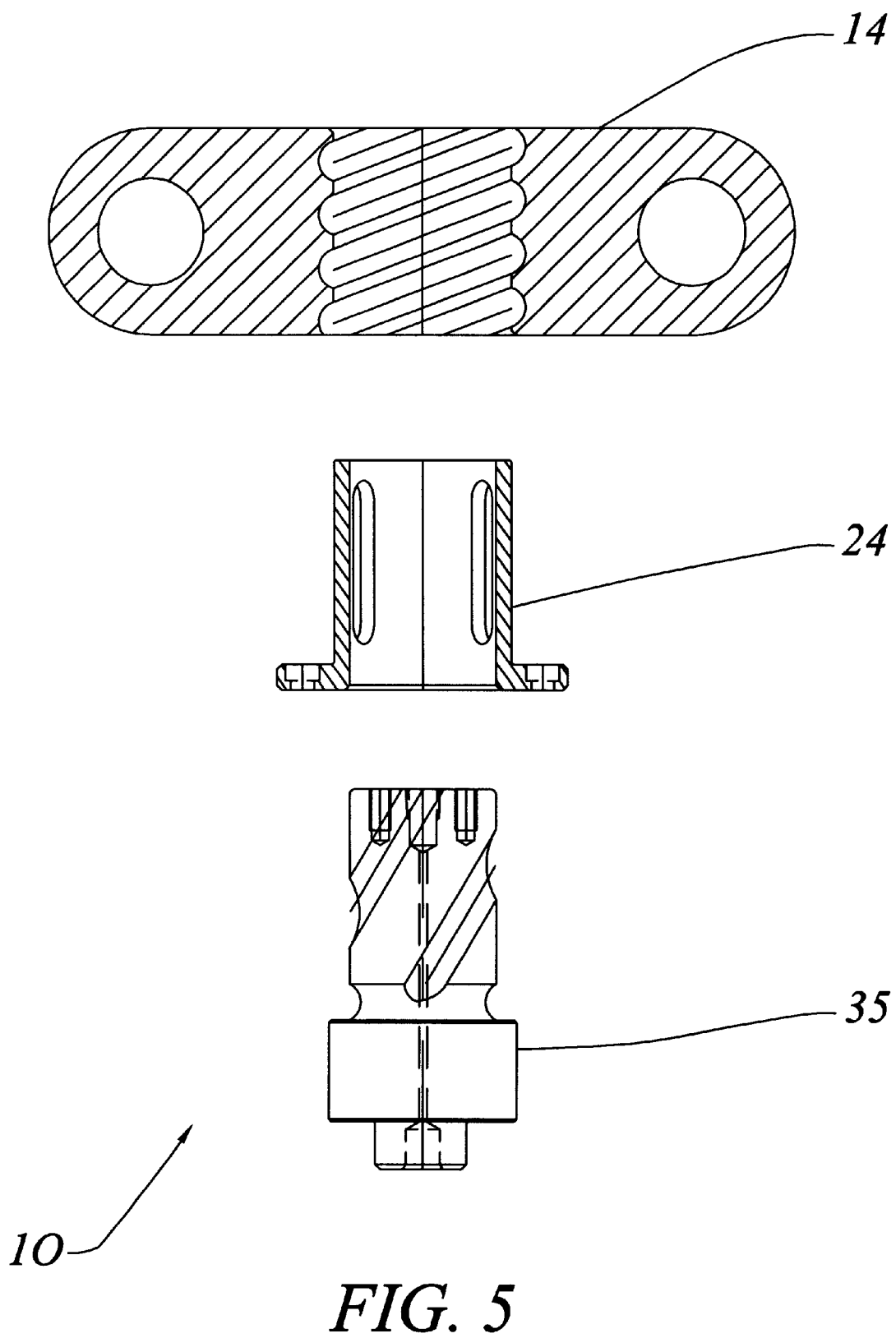
FIG. 5 is an exploded view, partially in section, of the operator of FIG. 1.

Referring now to the drawings, and more specifically to FIG. 1 and FIG. 5, there is shown valve operator 10 in accord with the present invention. While valve operator 10 may be used with valves generally to reduce operating torque, operator 10 is particularly suitable for valves where it is desired to have a compact operator, or an easily mounted operator, a simpler more reliable operator, or an operator wherein both manufacturing costs and labor installation costs are reduced. Thus, the benefits of use of the present invention are substantial where torque reduction is desired.

Figure 4:
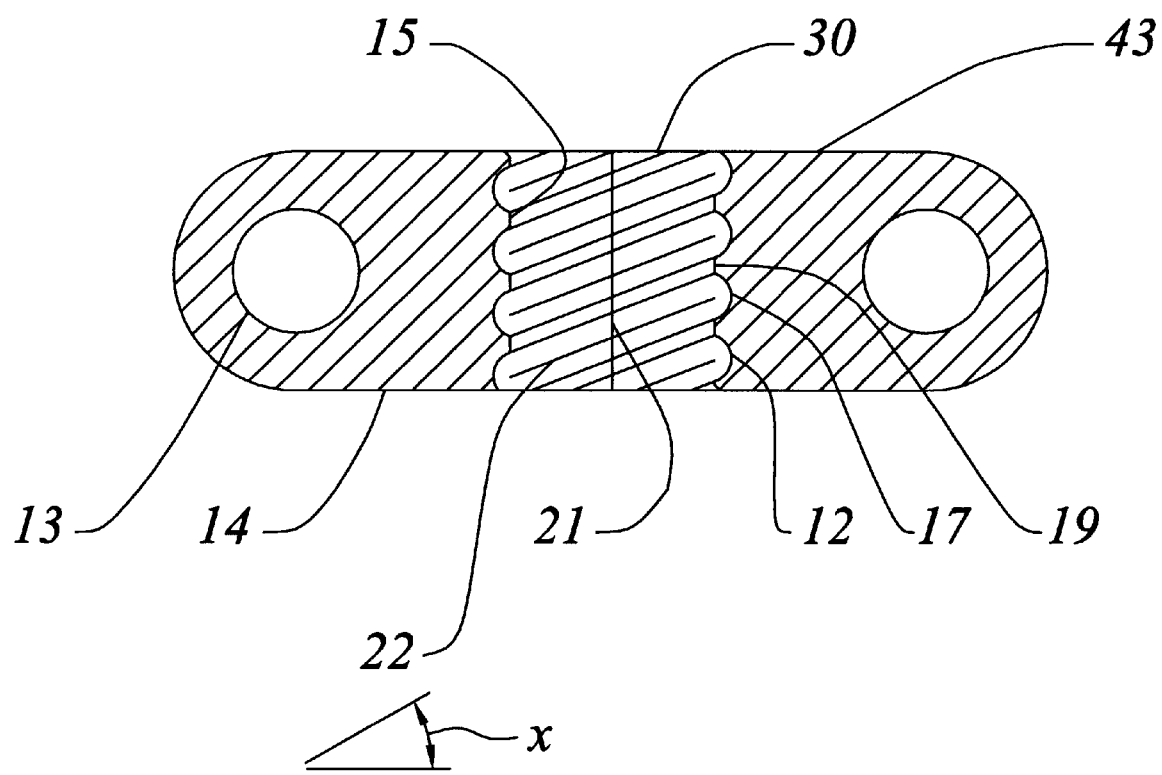
FIG. 4 is an elevational view, in section, of a handle component in accord with the present invention adapted to fit around the components shown in FIG. 2 and FIG. 3.

It will be pleasing to those skilled in the art that outer handle adaptor 14 of FIG. 1, or a different version shown in FIG. 4, may be used with different types of pipe receptacles such as receptacles 11 or 13, and is similar or even the same size as a simple straight shaft handle adaptor that might commonly be used for operation with no torque reduction. Pipes or rods may be inserted into receptacles 11 or 13 to open or close the valve. Thus, the installed operator 10 takes up little or no more room than does the valve without a torque reduction device of the present invention installed. It will be understood that outer handle adaptor 14 may be of various types and shapes as are commonly used with valves. Outer handle adaptor 14 could also be made for use within a powered operator (not shown) for reduced cost, energy usage, and for reducing friction, e.g., for reduction of 1000 ft-lb load to a 333 ft-lb load.

In the presently preferred embodiment, adaptor 14 therefore acts as the outside operating component to which an external rotational load is applied.

Referring to FIG. 4, tracks 12 are provided on internal surface 15 of adaptor 14 that defines bore 30. Bore 30, in this preferred embodiment, extends completely through adaptor 14. Tracks 12 curve around surface 15 to form a threadlike engagement surface that may be spiraling, helical, curved or the like. At any point in the curved track 12, a groove 17 or ridge 19 is angled as indicated by lines 22, by an angle of x degrees with respect to bore centerline 21. In a preferred embodiment, the angle of x degrees stays constant along the entire curved, spiraling, or helical length of track 12. As will be understood, the angle x is part of the relationship that determines the torque reduction of operator 10.

Figure 3:
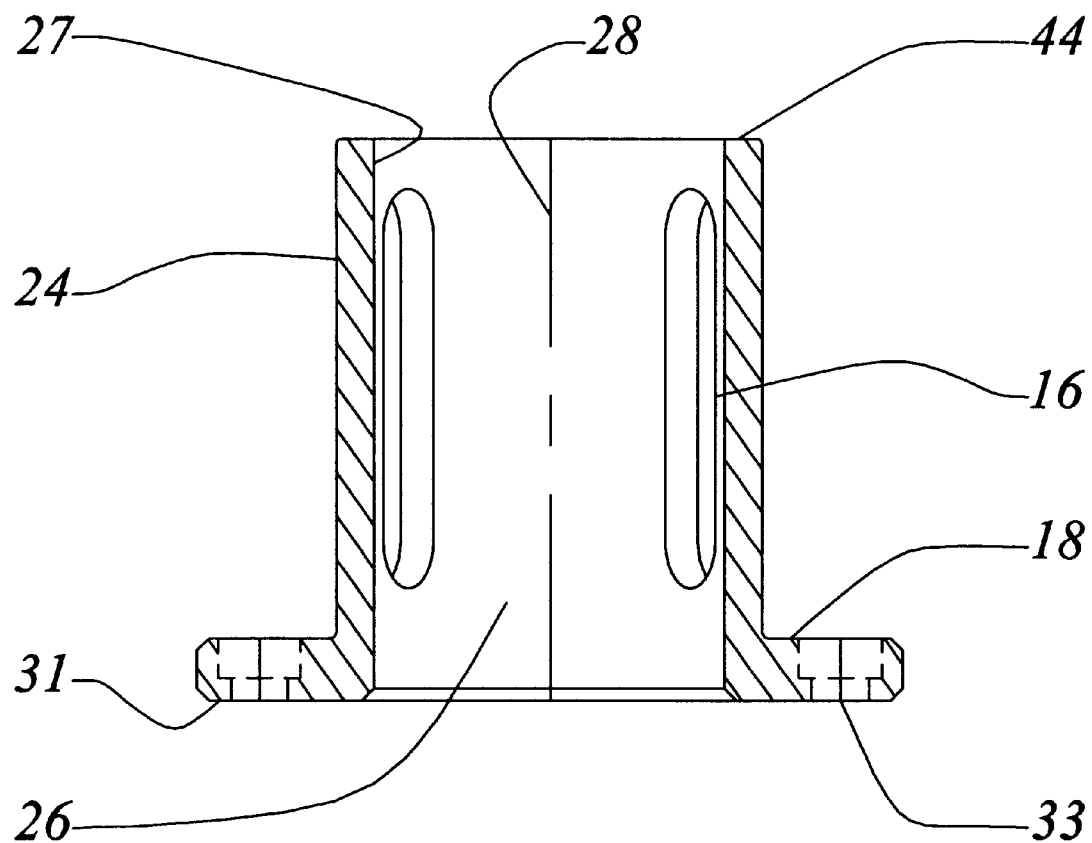
FIG. 3 is an elevational view, in section, of an inner component in accord with the present invention adapted to fit around the component of FIG. 2.

Outer handle adaptor 14 surrounds middle cylinder 24 shown in FIG. 3. In this embodiment, the outer diameter of middle cylinder 24 is slightly less than the inner diameter of ridges 19 within bore 30 so as to preferably provide sliding contact and support so that the axis of rotation 28 is the same for both outer handle adaptor 14 and middle cylinder 24. Bore 26 extends through the length of middle cylinder 24 and, except for middle cylinder tracks 16, inner surface 27 of bore 26 is preferably smooth. Middle cylinder tracks 16 are, in the present embodiment, slots that run parallel with respect to centerline 28 of bore 26 and with respect to the axis of rotation 36 indicated in FIG. 1. In the present embodiment, three middle cylinder tracks 16 are used but the number of tracks may be varied. Conceivably the tracks could also be angled with respect to axis of rotation 36 or could be curved rather than straight. Generally, the number of tracks may be selected to produce smooth operation and the number of tracks 16 is effectively limited by the dimensions of the component sizes. Although only one track 16 could conceivably be used, there might be a tendency for binding in such a case.

In practice, middle cylinder 24 is preferably fixed to the valve body so as to preferably be prevented from rotational movement relative to the valve body 42, indicated in FIG. 1 by dashed lines. Flange 31 with screw holes 33 provide a convenient means of securing middle cylinder 24 to valve body 42. A valve body can generally easily be adapted/machined/drilled and tapped to receive the fasteners of screw holes 33. The upper surface 18 of flange 31 also gives additional alignment support to outer handle adaptor 14 so that an axis of rotation 36 (see FIG. 1) is fixed for all components with respect to valve body 42 including centerline 28 of FIG. 3.

Within tracks 16, balls 29 are preferably utilized as indicated in FIG. 1. Balls 29 may be chrome alloy steel balls, or the like. In this embodiment, preferably one ball 29 is used per track 16. Depending on the reduction ratios involved and the physical size of the operator, different numbers of balls 29 may be used per slot or track 16. The number of balls is limited for use in slot or track 16, for instance, by the length of slot or track 16. For larger size valves, more and longer tracks 16 may be used, if desired. During operation, balls 29 must be free to move through track 16 for the desired turns ratio. Balls 29 preferably mate in outer diameter size to the inner diameter of grooves 17 within outer handle adaptor 14. Rotation of outer handle adaptor 14 rotates grooves 17 to force balls 29 to follow the curved, helical, and/or spiral path of tracks 12 formed by grooves 17 and ridges 19. Middle cylinder tracks 16 also constrain ball (balls) 29 to movement within middle cylinder tracks 16 which preferably is a straight line parallel to axis of rotation 36 and centerline 28.

Figure 2:
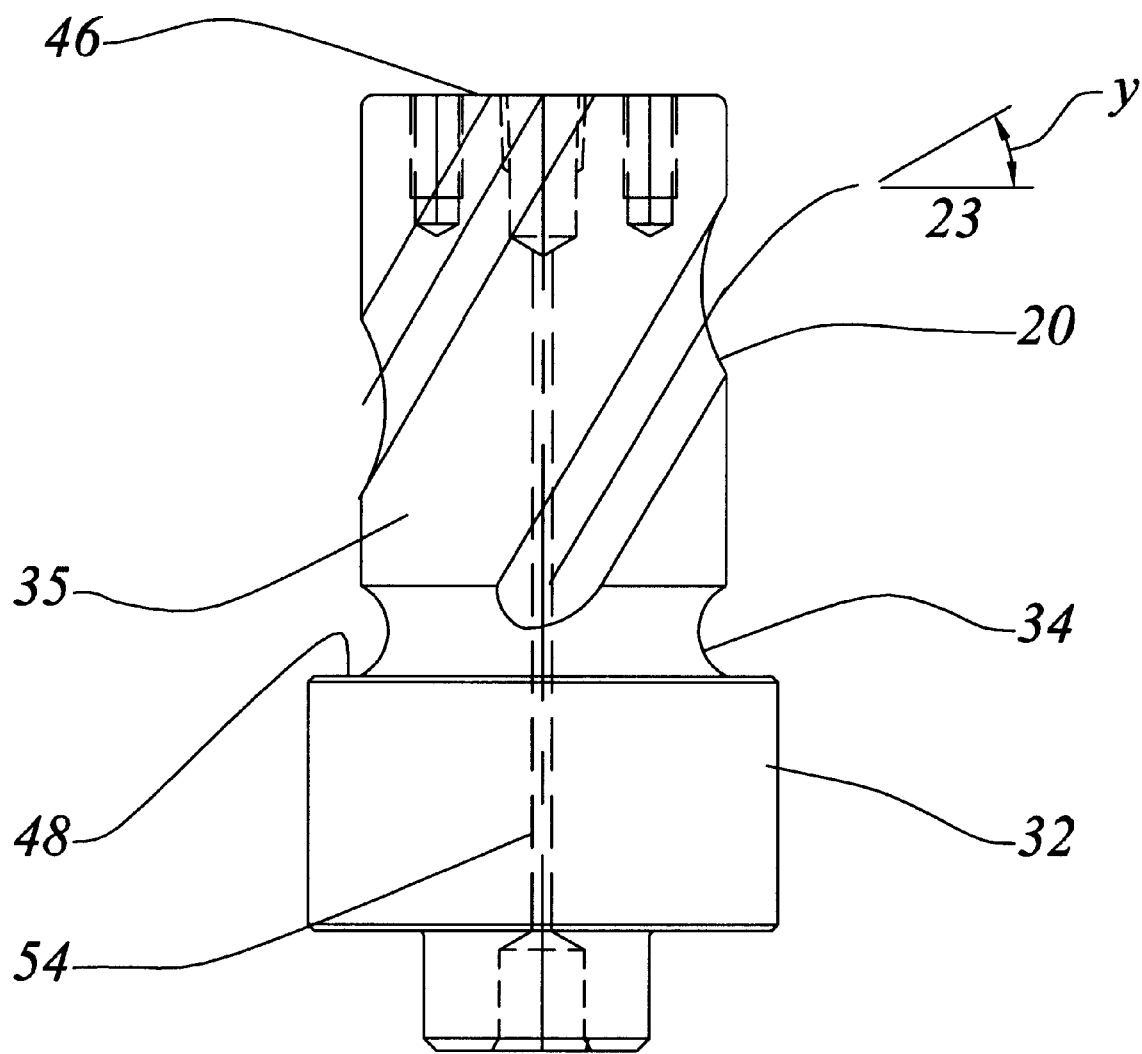
FIG. 2 is an elevational view, with internal portions thereof indicated in dash, of a drive component with external tracks in accord with the present invention.

Shaft adaptor 35, shown in detail in FIG. 2, is positioned within middle cylinder 24 as indicated in FIG. 1 and FIG. 5. As shown in FIG. 1, bolts 37 through flange 40 connect to shaft adaptor 35 so that flange 40 rotates with shaft adaptor 35. Flange 40 is used to secure handle adaptor 14 to valve operator 10. Markings may be provided on flange 40 and handle adaptor 14 to readily indicate whether the valve is in the open or closed position. Shaft adaptor 35 connects to the valve stem, indicated in dash as valve stem 50 in FIG. 1, for rotation therewith. Flange 40, of FIG. 1, preferably makes sliding contact with outer handle adaptor 14 at the corresponding upper surface 43, indicated in FIG. 4, to prevent riding up of outer handle adaptor 14 during operation. In one embodiment of the present invention, bearings (not shown) are used between flange 40 and upper surface 43. Flange 40 preferably does not make contact with surface 44, indicated in FIG. 3, of middle cylinder 24 so as to reduce operating friction. Flange 40 does make contact with and is secured to surface 46, indicated in FIG. 2, of shaft adaptor 35. Handle adaptor 14, middle cylinder 24, and shaft adaptor 35 are aligned such that handle adaptor 14 and shaft adaptor 35 rotate about axis of rotation 36. Shoulder 48 of shaft adaptor 35 engages a portion of flange 31 for additional support and strength of operator 10.

Referring to FIG. 2, the spiral, groove, or track 20 of shaft adaptor 35 has an angle y offset with respect to axis of rotation 36. The ratio of angle y to angle x determines the amount of torque reduction in operator 10, as discussed below. Grease nipple 52, shown in FIG. 1, may be used to apply grease through passageway 54 as desired.

In operation, handle adaptor 14 is the outside drive component onto which is applied an external force for rotating handle adaptor 14 such as with a wheel, lever, or the like. For instance, pipe receptacles 11 or 13 or the like may receive a bar for operation when necessary. The rotation of handle adaptor 14 rotates helical, curved, or spiraling grooves or tracks 12 that act on balls 29 that are disposed within each of middle cylinder slots or tracks 16. Middle cylinder 24 is fixed to valve body 42 and therefore does move relative to the valve body. Thus, balls 29 are constrained by middle cylinder slots 16 to movement parallel to center of rotation 36 within tracks 12, or in other words to straight line movement. Therefore, as the balls are forced to move in a straight line in cylinder slots 16 by rotation of handle adaptor 14, balls 29 act on shaft adaptor 35 by transferring force thereto through curved, spiraling, or helical tracks 20. The force acting through balls 29 in shaft adaptor helical path 20 thereby rotates shaft adaptor 35. Because bore 30 of handle adaptor 14 has a larger number of turns than shaft adaptor 35 due to smaller angle x than angle y, handle adaptor 14 will turn more rapidly than shaft adaptor 35 by a desired ratio. Thus, for the same amount of linear movement of ball 29 in slot 16, outer handle 14 rotates more than shaft adaptor 35 by a selected ratio. The torque reduction of operator 10 is the same ratio. In other words, if outer handle adaptor 14 rotates three times as far as shaft adaptor 35 with the same movement of ball 29, then the torque reduction achieved is a three-to-one ratio.

In concept, three tracks, respectively in outer handle 14, middle cylinder 24, and shaft adaptor 35, are acted on by balls 29. Two of the tracks, i.e. tracks 12 and tracks 20, are curved and lie on a cylindrical surface, in the present embodiment, but could also lie on other surfaces such as a cone. The third track, slots 16, is preferably straight, but could also be curved, if desired. The curved tracks preferably have a constant angle along their length with respect to a plane perpendicular to the axis of rotation. One track, such as track 20, spans the circumference of a first cylindrical inner surface by n degrees. Another curved track, such as track 12, spans the circumference of a second cylindrical surface by an amount b×n degrees where b is the amount of torque reduction in the system, when the third track, such as track 16, is straight. Direction of the helical track only designates the direction of rotation and can be varied. Positioning of the tracks can be arranged in any manner so long as force is transferred to all three tracks simultaneously. The drive force for operation could be applied to other elements rather than the outer one as per the present embodiment where drive force is applied to handle adaptor 14.

Numerous variations of the present invention are possible. Other numbers of bodies could conceivably be used to effect the same essential operation. Balls are not absolutely required as shown in the presently preferred embodiment. For instance, a sleeve with outer threads/protrusions and inner threads/protrusions could be driven by an outer cylinder with mating inner threads/protrusions. Upon reflection, it will be understood that the tracks/surfaces of the invention for transmitting torque can take many variations that apply the same concept of the present invention. Bearings may be added between sliding surfaces as desired. The present invention, although designed for torque reduction purposes, could be used for torque multiplication if the input and output are reversed.

Therefore, the present invention may be embodied in different ways wherein the same concept of the invention is applied. Thus, the above described preferred embodiment is described in accordance with requirements of the patent laws to aid understanding of the invention and is clearly not intended to limit the invention to the particular preferred embodiment described.

What is claimed is:

1. A valve operator for actuating a valve, said valve being of the type having a valve body and a rotary valve shaft rotatable with respect to said valve body, said valve operator comprising:

a first component having a first curved track;

a second component having a second curved track, said second component being mounted within said first component and being rotatably mounted with respect thereto; and a third component mounted between said first component and said second component and being engageable to transfer energy between said first curved track and said second curved track, said first component being mounted to said third component such that said first component is rotationally moveable with respect to said valve body for effecting said transfer of energy.

2. The valve operator of claim 1, further comprising:

a connection end for said third component, said connection end being profiled for rigid non-rotational attachment to said valve body.

3. The valve operator of claim 1, further comprising:

a connection end for said second component, said connection end being profiled for attachment with said rotary valve shaft.

4. The valve operator of claim 1, wherein said third component further comprises:

a sleeve with at least one slot defined therein; and one or more balls disposed in said at least one slot for engageably connecting with said first and second components.

5. The valve operator of claim 4, wherein:

said slots are substantially parallel to an axis of rotation of said third component.

6. The valve operator of claim 1, wherein:

said first curved track comprises at least one spiraling slot.

7. The valve operator of claim 1, wherein:

said first curved track comprises helical fluting.

8. The valve operator of claim 1, wherein:

said first curved track comprises helical ridges.

9. The valve operator of claim 1, wherein:

said second curved track comprises spiraling slots.

10. The valve operator of claim 1, wherein:

said first curved track is oriented at a first angle with respect to an axis of rotation of said first component, and said second curved track is oriented at a second angle with respect to an axis of rotation of said second component.

11. The valve operator of claim 10, wherein:

said first angle is not equal to said second angle.

12. The valve operator of claim 10, wherein:

said first angle and said second angle are arranged to produce a selected turns ratio between said first component and said second component.

13. A valve operator operable for actuating a valve, said valve being of the type having a valve body and a rotary valve shaft rotatable with respect to said valve body, said valve operator comprising:

a first component having an inner engagement surface;

a second component having an outer engagement surface, said second component being mounted within said first component and being rotatably disposed with respect thereto; and a third component mounted between said first component and said second component, said third component having an outer contoured profile for engageably connecting with said inner engagement surface and an inner contoured profile for engageably connecting with said outer engagement surface, said third component being rotatable with respect to said first component and said second component and being rigidly securable with respect to said valve body so as to be non-rotational with respect to said valve body.

14. The valve operator of claim 13, wherein:

said inner engagement surface of said first component comprises a curved configuration, said first component being mountable so as to be rotational with respect to said valve body for said actuating of said valve, and said outer engagement surface of said second component comprises a curved configuration.

15. The valve operator of claim 13, further comprising:

said inner engagement surface defining at least one curved slot.

16. The valve operator of claim 13, further comprising:

one or more protrusion elements extending radially outwardly of said third component to form said outer contoured profile, and one or more protrusion elements extending radially inwardly of said third component to form said inner contoured profile.

17. The valve operator of claim 16, wherein:

said protrusion elements comprise spherical surfaces.

18. A method for a torque conversion operator for conversion of an applied torque to rotate a shaft, said shaft being rotatable within a body, comprising:

providing first, second, and third components such that said second component is within said first component and said third component is between said first and second components;

providing said first component with a surface for rotary engagement at a first pitch angle with said third component;

providing said second component with a surface for curved engagement at a second pitch angle with said third component; and adapting said first component to receive said applied torque to be converted for rotating said shaft within said body.

19. The method of claim 18, further comprising:

affixing said third component to said body so as to be non-rotational with respect to said body.

20. The method of claim 19, further comprising:

adapting said first component to support a handle.

21. The method of claim 19, further comprising:

affixing said second component to said shaft.

* * * * *